Dec. 16, 1952   A. S. KROTZ   2,621,923
RUBBER SPRING
Filed March 1, 1947
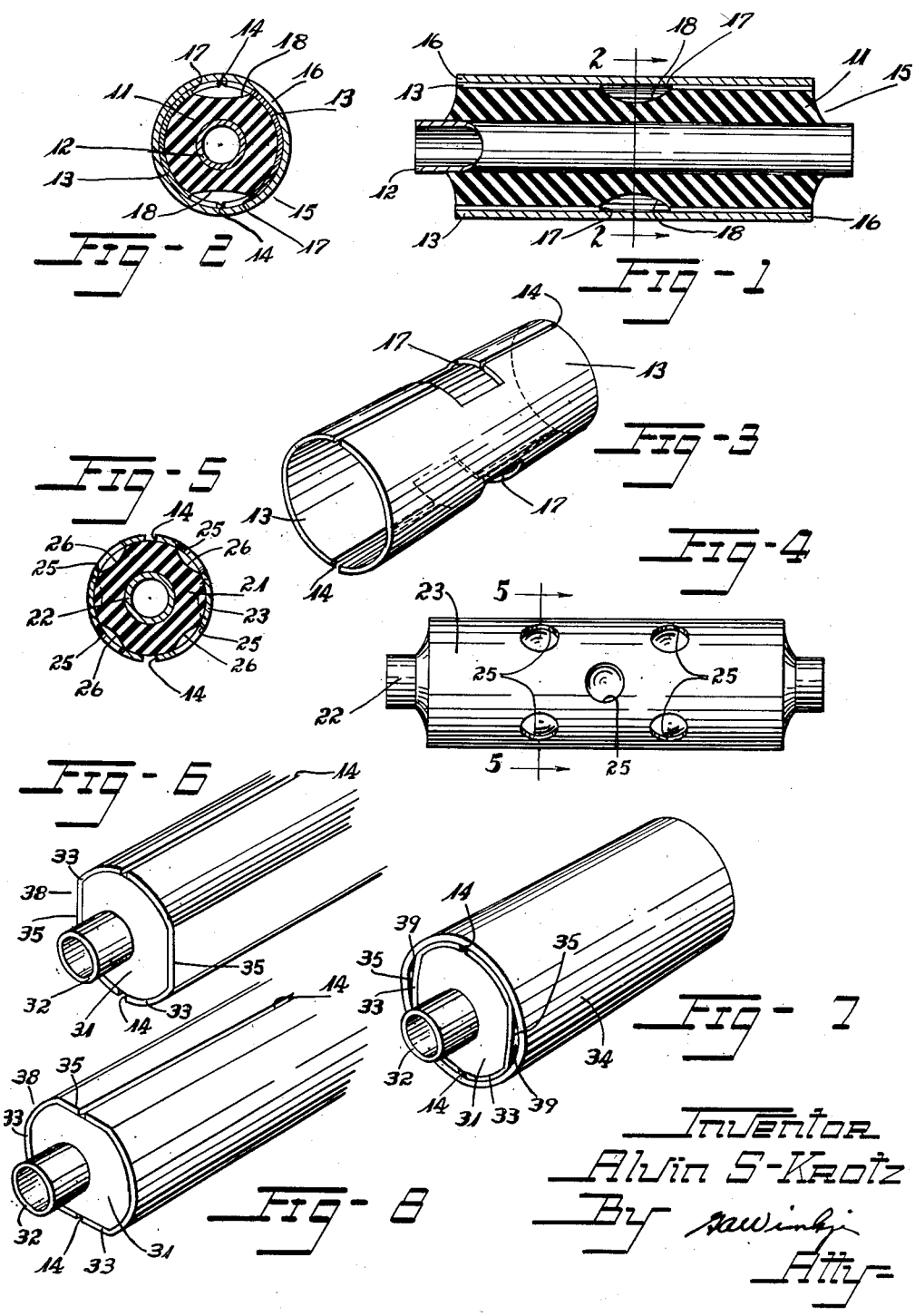

Patented Dec. 16, 1952

2,621,923

UNITED STATES PATENT OFFICE 2,621,923

RUBBER SPRING

Alvin S. Krotz, Akron, Ohio, assignor to The B. F. Goodrich Company, New York, N. Y., a corporation of New York Application March 1, 1947, Serial No. 731,882

5 Claims. (Cl. 267—57.1)

This invention relates to springs of resilient rubber or other rubber-like material which are mounted under slight or considerable compression in housings and especially to those springs which are incorporated for use in torsion.

Rubber torsion spring assemblies are usually mounted in housings under sufficient compression at least to provide a tight fit between the spring assembly and housing. It is desirable that the compression be limited in order that the resilient material will not protrude excessively at the exposed end portions. The inner diameter of the housing affects the compression of the spring assembly and heretofore the allowed tolerances of the inner diameter have been necessarily small to obtain the desired amount of compression. The required close tolerances of the housing cause housings not within the limit to be rejected or machined resulting in waste in the production of torsion springs.

Objects of the invention are to provide an improved spring construction, to provide a spring with a minimum protuberance at the end portions when under radial compression, to provide spaces for accommodating displaced portions of the rubber-like material when under compression, and to provide for convenience of manufacture of the spring assembly.

These and other objects will be apparent from the following description, reference being had to the accompanying drawings in which:

Fig. 1 is a sectional elevation of a spring assembly embodying the invention.

Fig. 2 is a section taken along line 2—2 of Fig. 1.

Fig. 3 is a perspective view of the outer shell of the spring assembly.

Fig. 4 is an elevation of a modified construction.

Fig. 5 is a section taken along line 5—5 of Fig. 4.

Fig. 6 is a perspective view of a further modified construction.

Fig. 7 is a perspective view of the spring shown in Fig. 6 mounted in a housing.

Fig. 8 is a perspective view of a still further modified construction.

A spring 11 or body of resilient rubber or other rubber-like material constructed in accordance with and embodying the invention is shown in Figs. 1 to 3. The spring 11 is disposed about and mounted on a shaft 12 by vulcanization or by other suitable means. An annular shell member 13 which may be slotted and circumferentially discontinuous as shown in Fig. 3 is disposed about and mounted on the spring 11 and secured thereto by vulcanization or by other suitable means. The shell member 13 has slots 14, 14 extending from one end to the other in such a manner that the diameter of the spring may be reduced by moving the opposing edges of the slots 14, 14 toward each other. This has the advantage of permitting portions of the shell member 13, 13 to move relative to each other and thus allow the resilient rubber or other rubber-like material of the spring 11 to contract when removed from a mold and also has the advantage of permitting compression of the spring 11 for insertion into a restricted opening of a housing providing a tight fit between the housing and the shell member.

The shaft 12, spring 11 and shell member 13 comprise a spring assembly 15 which is mounted in a housing member 16 which has an inside diameter smaller than the outside diameter of the spring assembly 15 in the normal unstressed position. In mounting the spring assembly 15 in the housing 16 the diameter of the spring assembly is reduced and the resiliency of the spring urges the shell member 13 against the housing wall providing a tight fit.

Openings 17, 17 are provided in the shell member 13 as shown in Fig. 3 and indentations 18, 18 are provided in the surface of the spring adjacent the openings to provide limited spaces between the actual outer surface of the spring assembly and the continuation of the cylindrical portion of the outer surface, which spaces have a depth which is only a fraction of the radial dimension of the cylindrical portion of the body of rubber-like material so that all the portions of the body of rubber-like material are integral and coact to provide the desired cushioning. The indentations 18, 18 may be of any desired shape but are preferably molded with a concave dished shape and with smooth contour as shown in Figs. 1 and 2. Not only is it easier to mold the indentations 18, 18 with a smooth contour but the stresses imposed upon the spring 11 will be evenly distributed and the life of the spring will be increased by the use of smoothly contoured spring shapes.

In the mounting of the spring assembly 15 in the housing 16 the resilient rubber-like material of the spring 11 will be compressed and distorted in such a manner that it will protrude into the spaces at the outer surfaces of the spring assembly 15 which are formed by the openings 17, 17 in the shell member 13 and the indentations 18, 18 in the spring. The presence of these spaces reduces the protuberance at the end portions and provides an improved distribution of the stresses within the spring material.

In the embodiment of Figs. 4 and 5 a spring of resilient rubber or other rubber-like material is secured by vulcanization or other suitable means to a shaft 22 and to an outer shell member 23 which may be slotted and circumferentially discontinuous as shown in Fig. 5. The shell member 23 has apertures 25, 25 at spaced-apart positions axially and circumferentially of the shell member. The spring has indentations 26, 26 which are adjacent the apertures 25, 25. As shown in Figs 4 and 5 the resulting spaces formed by the indentations 26, 26 and the apertures 25, 25 between the actual outer surface of the spring assembly and the continuation of the cylindrical portion of the outer surface, have a depth which is only a fraction of the radial dimension of the cylindrical portion of the spring of resilient rubber and accommodate portions of the spring which are displaced when the spring is compressed upon insertion in a housing. The plurality of spaces reduces the protuberance at the spring end portions and in addition distributes the stresses set up by the compression of the spring over the length of the spring.

In the construction of Figs. 6, 7 and 8 a spring 31 is disposed between a shaft 32 and an outer shell member 33 which may be slotted, circumferentially discontinuous and relatively thin and flexible as shown in Figs. 6 and 8. The spring 31 is composed of resilient rubber or other rubber-like material and is secured to the shaft 32 and to the shell member 33 by vulcanization or by other suitable means. The spring 31, shaft 32 and shell member 33 comprise a spring assembly 38 which may be mounted in a housing 34, the resilient rubber or rubber-like material of the spring being under compression.

The shell member 33 is generally cylindrical in shape. However, the form of the outer surface of the shell member may deviate from the form of the inner surface of the housing 34 as shown in Figs. 6 and 7. The shell member 33 deviates from the cylindrical form of the housing 34 at circumferentially spaced-apart positions where the shell member has flattened surfaces 35, 35, extending from end to end of the spring and provides limited spaces between the actual outer surface of the spring and the continuation of the cylindrical portion of the outer surface, which spaces have a depth which is only a fraction of the radial dimension of the cylindrical portion of the spring 30 so that all the portions of the spring of resilient rubber-like material are integral and coact to provide the desired cushioning. The flattened surfaces 35, 35 are in effect formed with an infinite radius of curvature as compared with the smaller radius of curvature of the other portions of the shell.

Upon insertion of the spring assembly 38 in the housing 34 spaces 39 will result between the surfaces 35 of the sleeve member 33 and the curved inner surfaces of the housing 34. Portions of the resilient rubber or rubber-like material of the spring 31 will be displaced into the resulting spaces and will bend the shell member 33 towards the housing 34. The protuberance of the spring at the end portions will be reduced as a result allowing compression of the spring with large tolerances of the housing dimensions.

Variations may be made without departing from the scope of the invention as it is defined in the following claims.

I claim:
1. A torsion spring assembly comprising inner and outer elements and a circumferentially continuous intervening body of resilient rubber-like material bonded to said inner and outer elements in torque-transmitting relation to said elements, said outer element being slotted from one end thereof to the other providing circumferential discontinuity thereof to permit limited movement of said outer element to bring the margins of the slotted portion toward each other to compress the rubber material, and a housing having a bore to receive said outer element with the rubber material subjected to compression, said outer element having portions of its outer surface substantially conforming to the bore of the housing and portions thereof between its end faces spaced from and bridging said bore to permit displacement of the rubber material between the ends of said spring assembly under radial compression of said material by reason of confinement of the spring assembly in said bore with minimum displacement of said rubber-like material toward the ends of said assembly.

2. A torsion spring assembly comprising inner and outer elements and a circumferentially continuous intervening body of resilient rubber-like material bonded to said inner and outer elements in torque-transmitting relation to said elements, said outer element being slotted from one end thereof to the other providing circumferential discontinuity thereof to permit limited movement of said outer element to compress the rubber material, and a housing having a bore to receive said outer element with the rubber material subjected to compression, said outer element having portions of its outer surface conforming to the bore and other portions thereof having a greater radius of curvature than said bore and in spaced-apart bridging relation to said bore, and said outer element being of thin metal and said other portions being deformable under pressure due to displacement of said rubber-like material when the rubber is compressed by the outer element in the bore.

3. A torsion spring assembly comprising a torsion spring having an inner member, a body of resilient rubber material surrounding said inner member, an outer tubular shell member of flexible metallic material surrounding said rubber and having a slot extending from one end of the shell to the other end, the rubber being bonded to each of said members in torque-transmitting relation, a first portion of the shell member being curved at one radius of curvature along the length of the shell and a second portion of the shell member having a greater radius of curvature than said first portion along the length of the shell, and a housing having a cylindrical bore to receive the torsion spring by frictionally engaging the shell member, the bore being narrower than the widest lateral dimension of the shell member so that the shell member is constricted to reduce the width of the slot and to compress the rubber when the torsion spring is disposed in the bore, said first portion of the shell conforming to the shape of the bore and said second portion of the shell being deflected toward the bore by distortion of the rubber under compression.

4. A torsion spring assembly comprising an element including a bore and a torsion spring disposed in the bore, the spring having an inner member, an outer shell member, and a body of resilient rubber material bonded to each of said members in torque-transmitting relation, the shell member having a slot extending the length of the shell and the shell member being engaged with the bore to constrict the shell circumferentially for compressing the rubber, a first portion of the shell substantially conforming to the curvature of the bore along a major portion of the length of the shell and a second portion of the shell being spaced from the bore but deflected toward the bore along a major portion of the length of the shell by the distortion of the compressed rubber.

5. A torsion spring comprising an inner member, a body of resilient rubber material surrounding said inner member, and an outer tubular shell member of flexible, metallic material surrounding said rubber and having a slot extending from one end of the shell to the other end, the rubber being bonded to each of said members in torque-transmitting relation, a first portion of the shell member being curved at one radius of curvature along the length of the shell and a second portion of the shell member having a greater radius of curvature than the first portion along the length of the shell, the spring being adapted for mounting in a cylindrical bore with a pressed fit and the shell being deformable to reduce the width of the slots so that the rubber is compressed and distorted against said second portion of the shell thereby deflecting said second portion to reduce its radius of curvature along the length of the shell.

ALVIN S. KROTZ.

REFERENCES CITED

The following references are of record in the file of this patent:

UNITED STATES PATENTS

| Number | Name | Date |
| --- | --- | --- |
| 1,827,268 | Short | Oct. 13, 1931 |
| 1,835,013 | Chryst | Dec. 8, 1931 |
| 1,835,575 | Sanders et al. | Dec. 8, 1931 |
| 2,226,406 | Krotz | Dec. 24, 1940 |
| 2,246,847 | Herreshoff | June 24, 1941 |
| 2,251,698 | Willson | Aug. 5, 1941 |
| 2,509,145 | Henshaw | May 23, 1950 |
| 2,562,381 | Goldschmidt | July 31, 1951 |

FOREIGN PATENTS

| Number | Country | Date |
| --- | --- | --- |
| 303,260 | Great Britain | Jan. 3, 1929 |
| 680,434 | France | Jan. 18, 1930 |
| 586,192 | Great Britain | Mar. 11, 1947 |